United States Patent [19]
Foty

[11] 3,717,080
[45] Feb. 20, 1973

[54] DAPER DRIVE FOR VENTILATOR SYSTEM

[75] Inventor: James V. Foty, Minneapolis, Minn.

[73] Assignee: Lear Siegler, Inc., Minneapolis, Minn.

[22] Filed: April 12, 1971

[21] Appl. No.: 133,247

[52] U.S. Cl. .................98/38, 49/84, 137/625.28, 251/212, 98/121 A, 236/13
[51] Int. Cl. ..............................................F24f 13/04
[58] Field of Search .....98/38 B, 388, 121 R; 236/13; 251/212; 137/625.29; 49/82-85

[56] References Cited

UNITED STATES PATENTS

| | | | |
|---|---|---|---|
| 3,363,534 | 1/1968 | Spradling | 98/38 |
| 3,298,658 | 1/1967 | Alyea | 251/212 X |
| 2,708,295 | 5/1955 | Johnson | 49/82 |
| 3,179,338 | 4/1965 | Ostrander | 98/38 |
| 2,800,851 | 7/1957 | Kronrad et al. | 98/40 UX |

*Primary Examiner*—William E. Wayner
*Attorney*—Burd, Braddock & Bartz

[57] ABSTRACT

A damper drive for a ventilator system in which modulation at frequent intervals occurs between air flow in a pair of adjacent inlet ducts leading to a common duct, the modulation occurring by movement of a pair of damper sections, having blades mounted on common damper shafts. The drive includes a first quadrant gear mounted on a shaft of a damper motor which drives a second quadrant gear which in turn moves a damper driving rod connected to the individual damper shafts. The quadrant gears lie in planes which form an obtuse angle.

7 Claims, 3 Drawing Figures

INVENTOR.
JAMES V. FOTY
BY
Burd Braddock & Bartz
ATTORNEYS

DAPER DRIVE FOR VENTILATOR SYSTEM

BACKGROUND OF THE INVENTION

This invention relates to a damper drive for a modulating damper which modulates the proportions of air mixed from a pair of inlet ducts flowing into an outlet duct.

The damper drive includes a pair of quadrant gears connecting the damper motor to the damper and which are disposed generally at an obtuse angle with respect to one another.

Modern ventilation systems often use a modulation damper system in which the quantity of air is varied proportionately between a duct carrying relatively warm air and a duct carrying relatively cool dehumidified air in order to achieve the most responsive accurate temperature control in a ventilated area. This system has been found preferable to systems which merely cool or merely heat in any one mode of operation and which, therefore, can generally only cause a change in temperature in a ventilated area in one direction during operation in that mode. In addition, it will be appreciated that having an always available source of warmed air and cooled air to proportionately mix will produce a quicker response to demand than a system which requires that the heating and/or cooling units be turned on and off periodically and which consequently will involve time delays as the heat exchanger warms or cools to the required temperature for influencing the ventilation air.

It is necessary, therefore, to have accurately adjustable, efficient, and relatively trouble free drive units for controlling a modulating damper system in response to the demand of the ventilated area. It will be appreciated that the modulation of the dampers in such a ventilation system will probably occur fairly frequently and will be in relatively small increments in one direction or another in order to vary the temperature of the outlet air of the system so as to not cause sudden heating or cooling.

Ventilating units of modern design come in many models having various characteristics and capacities. Many units are custom designed for a specific job because of capacity requirements or physical space limitations. It is desirable to have a standard damper drive unit which can be used with essentially all models of a given ventilating system. One problem with standardizing present damper drive units is that the gearing and connecting linkage must be redesigned for each unit to insure that the drive motor is located out of the air flow path and securely mounted. Therefore a standard gearing arrangement is needed for damper drive units which can be used with a plurality of different ventilating system designs, and which can operationally relate a standard damper drive motor to its dampers over a wide variation of angular relationship of the motor to the dampers.

Various damper drive arrangements are known. U.S. Pat. No. 3,003,408 shows a damper operating arrangement in which a large gear 14 drives a flexible sheet damper. However, in this patent the large gear only transfers motion in the same orientation as the direction of movement of the gear teeth on the gear itself. The orientation of the transferred movement does not result in a change of direction and consequently an additional worm gear and sprocket must be used to change the direction of transferred movement. These extra gears increase the lost motion in the drive mechanism, and add an undesirable friction load to the drive train.

U.S. Pat. No. 2,806,689 shows a similar arrangement for driving a different type of damper but which has the same disadvantages, namely motion is transferred to the teeth of a rack, best seen in FIG. 4 of the patent, only in the same direction as the pinion gear rotates.

Similarly, U.S. Pat. No. 2,471,962 shows a rack and pinion gear for driving an awning and in which the direction of movement of the rack is in the same direction as the movement of the pinion gear teeth. If it is desired to change the direction or orientation of the motion which is transferred through the gearing arrangements shown in these patents, it is necessary to employ additional gearing for that purpose. Any additional gearing will cause imprecision in the drive mechanism through lost motion when the direction of movement changes. See also U.S. Pat. No. 2,637,547 which shows sector gears engaging pinions to operate the louver adjusting mechanism of a window. None of these arrangements shown in the art related to air or ventilation dampers has the advantage of transferring motion through an angular gradation; and, consequently, it is desirable to provide a gear drive for a ventilating system which will transfer motion accurately and without lost motion in the drive mechanism and which will allow the elimination of gears purely to change the direction of orientation or rotational movement.

SUMMARY OF THE INVENTION

In a combination heating and cooling modulation damper ventilation system, a particular drive system is provided so that the damper can be intermittently driven by a motor drive for accurate modulation of air flow without lost motion in the drive train. To provide efficient temperature control using such a system, simplicity and relatively few moving parts are both desirable so as to provide the accuracy, without lost motion and without excessive friction.

This invention includes a damper drive linkage which may be used without redesign with a plurality of different ventilating systems. This is accomplished using a pair of quadrant gears, as will be explained further, which will transfer motion through an angular relationship which may vary widely, as necessary, to meet the requirements of a particular design.

While this specification refers to heating and cooling, it is to be understood that the system and invention would function equally well in modulating flow from two sources of fluid under pressure and having other variant characteristics, such as high humidity air and low humidity air. Air entrained particles of different colorations could be blended by modulation using the invention, and so could oils of different viscosities, for example.

A pair of inlet ducts are provided, adjacent one another, one having a heating unit therein and the other having a cooling unit therein. The inlet ducts terminate in a common plane at a common damper assembly in a plenum or compartment formed as part of an outlet duct. The damper assembly ducts, out of said common plane of termination of the inlet ducts. The shaft open cross sectional area of both ducts. The damper blades for each of the inlet ducts are mounted on common shafts; a blade for a first duct being situated at a 90° angle with respect to a damper blade for the second duct on a particular shaft.

Each shaft on which the damper blades are mounted is connected to a common damper drive rod by a crank arm. One damper drive shaft has mounted thereon a quadrant gear and is similarly connected to the damper drive rod. A damper motor is fixedly mounted relative to one of the inlet ducts. The shaft of the damper motor has secured thereto a driving quadrant gear which engages the driven quadrant gear secured to the damper drive shaft. As shown, these quadrant gears are disposed to lie in planes forming an obtuse angle with respect to each other and the drive motion is effectively transmitted through this angular arrangement from the damper drive motor to the damper assembly.

IN THE DRAWINGS

DESCRIPTION OF THE PREFERRED EMBODIMENT

Figure 1:
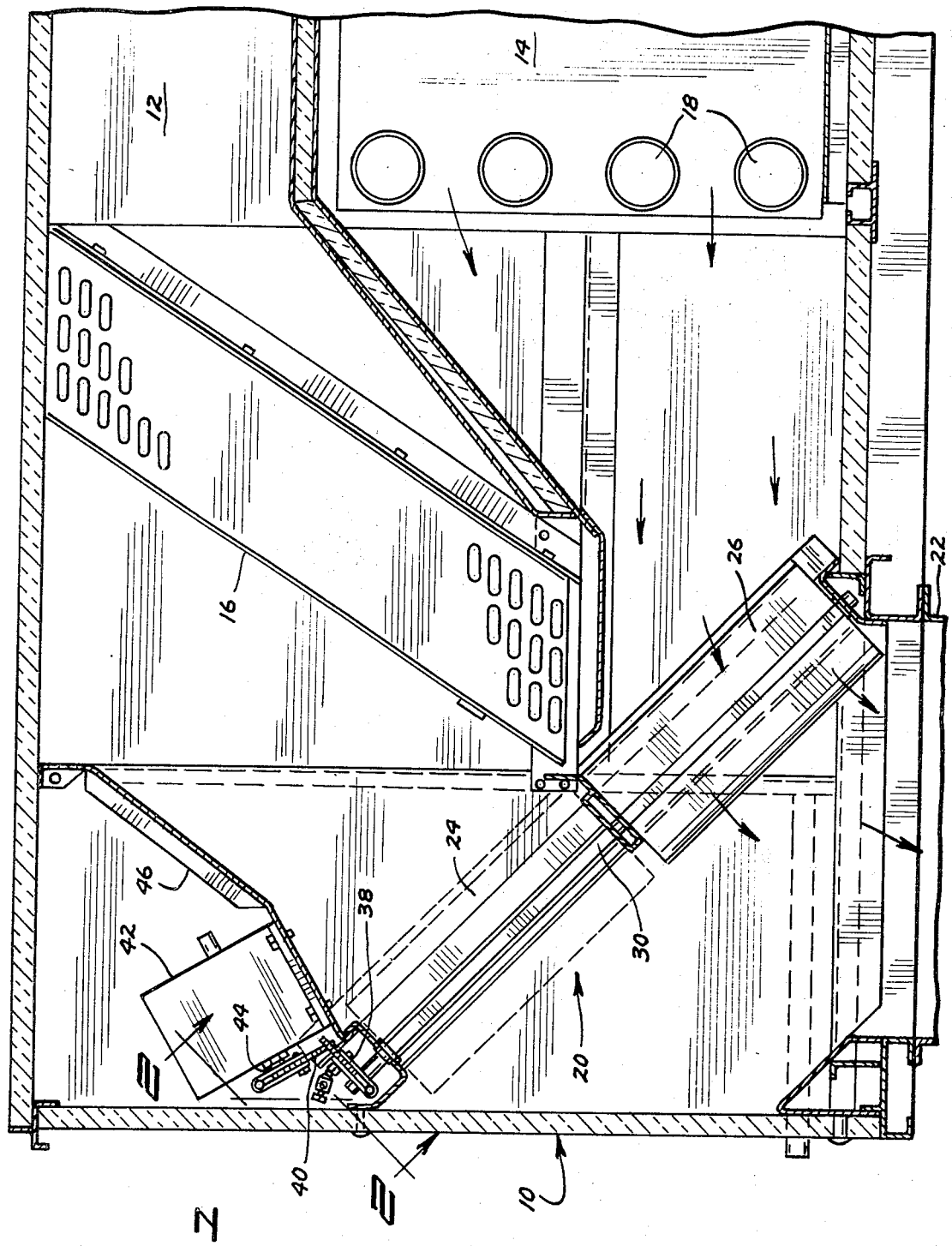
FIG. 1 is a vertical sectional view of a ventilating system incorporating the damper drive of this invention.
Figure 2:
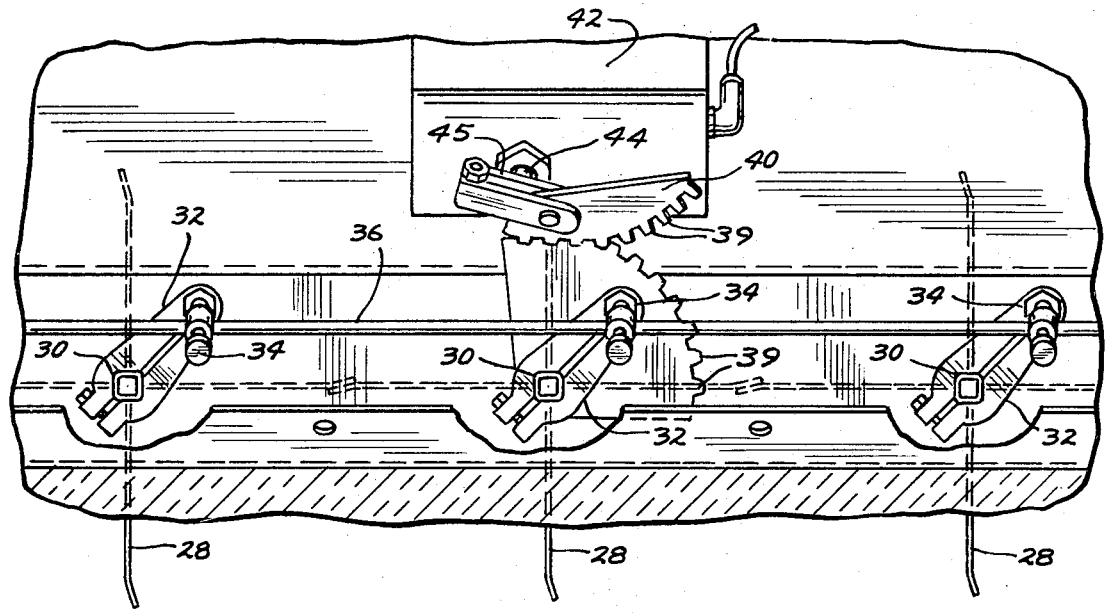
FIG. 2 is an enlarged fragmentary view taken generally along lines 2—2 of FIG. 1.
Figure 3:
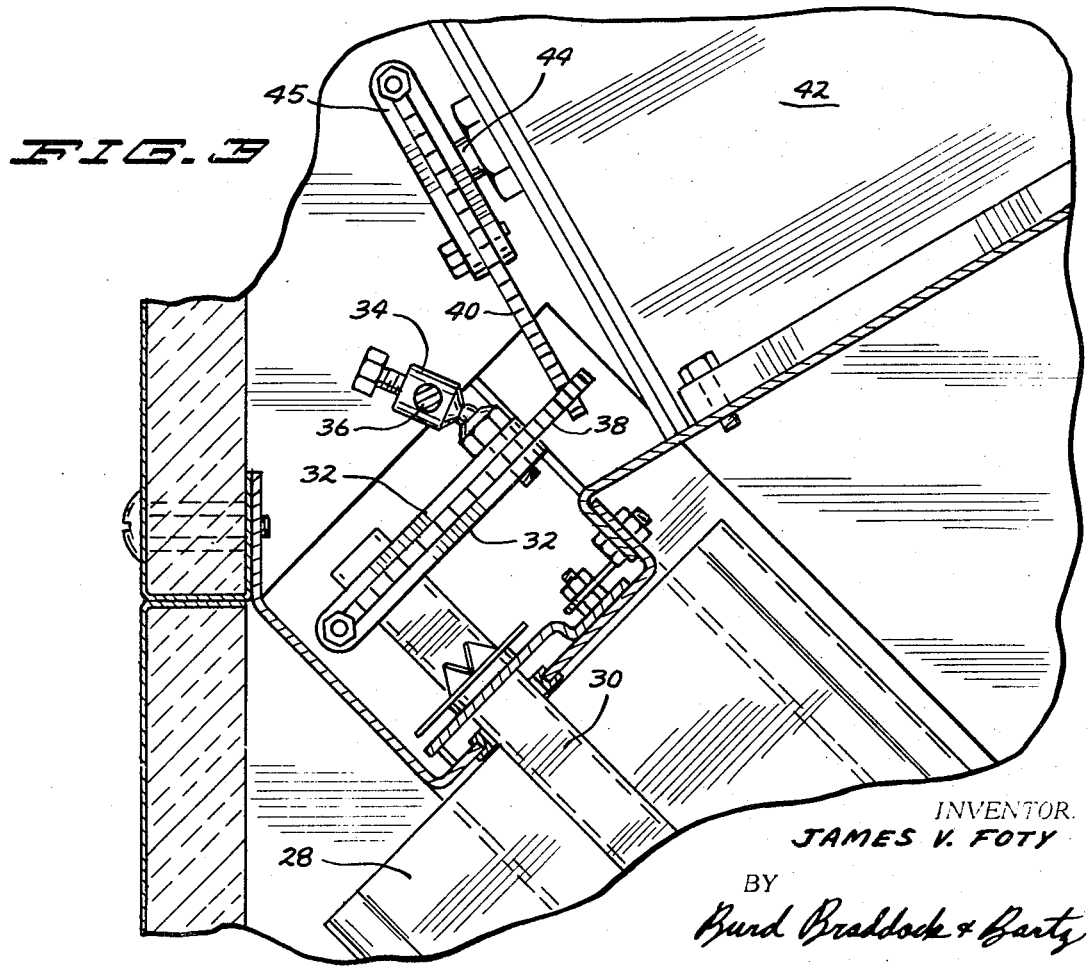
FIG. 3 is a detailed enlarged fragmentary vertical sectional view of a portion of the ventilator system shown in FIG. 1.

In FIG. 1 a combined heating and cooling system is shown installed in a plenum or outlet compartment 10 of a ventilation system. Air under pressure (from a source not shown) enters the compartment 10 through adjacent inlet ducts 12 and 14. Air entering the compartment through duct 12 passes through an evaporator coil 16 for refrigeration while air entering through duct 14 passes over a heater core 18 shown in cross section. Air enters the compartment by passing through a modulating damper assembly, generally designated by reference numeral 20, and passes from the compartment through an outlet duct 22 to the area to be ventilated.

As shown, the damper assembly 20 is mounted generally at a 45° angle across a corner of compartment 10. This angle can vary widely from installation to installation. The damper assembly has two sections, a first section 24 for controlling the proportion of cooled air passing through the evaporator 16 which passes to the ventilated area and a second section 26 controlling the proportion of heated air passing through the heater core 18 which passes to the ventilated area. Each damper section consists of a plurality of damper blades 28 each blade being mounted to a square damper shaft 30.

Blades for respective sections of the damper are mounted on each of the shafts 30 at right angles to one another so that, for example, when the blades in damper section 24 are closed and obstructing passage of air, the blades of section 26 are completely open, allowing the free passage of ventilation air. As each damper shaft is rotated through a 90° angle, the blades for the one section of the damper will go from a completely closed to a completely open condition while the blades for the other section of the damper will go from a completely open to a completely closed condition. As used in modern modulation ventilation systems, a common positioning of the damper blades will be such as to admit air from both ducts 12 and 14 simultaneously. In fact, there are instances where the blades will rotate through less than 90° and one or both of the ducts need never close. The damper assembly will accurately proportion the mixture of air from the two ducts to tend to produce the desired ventilation outlet temperature called for in the ventilated area.

At the upper end of each of the square damper shafts 30, a crank arm 32 is securely connected for driving that shaft and the pair of damper blades mounted thereon. Each of the crank arms 32 has an upstanding post 34 thereon which forms a floating pivot. All of the posts 34 are connected together by a damper drive rod 36 which drives the damper blades as a unit.

Mounted on one of the shafts 30 is a driven quadrant gear 38 having teeth 39 on the outer perimeter thereof and having an angular dimension slightly greater than 90°. The gear teeth 39 are not beveled so as to require engagement with other teeth at a specified angle. Consequently the gear segment need only be engaged at any convenient angle by another gear segment to be driven. This quadrant gear has a sufficient radius so that angular driving rotation can be readily imparted to the damper. Meshing with the teeth of quadrant 38 are the teeth of a driving quadrant gear 40 substantially identical to the quadrant gear 38. As shown, in this particular model ventilating system, quadrant gear 40 meshes with quadrant gear 38 in such a fashion that the angle between the two gears is somewhat greater than a 90° angle. It will be appreciated that the gears may be engaged at any angle through a substantial range from a small acute angle to a 180° angle. A motor 42 operates in each direction of rotation in response to the temperature demands of ventilated area. It drives a shaft 44 to which the quadrant gear 40 is mounted by a split clamp 45. The motor 42 is mounted on a framework 46 within the compartment 10.

In operation, the present gear arrangement results in a precise drive for the modulating damper assembly because there is relatively little lost motion in the gears as the motor changes direction. In addition, rotational drive motion is transmitted through an obtuse angle without the plurality of gears previously required. Of course, it will be appreciated that the quadrant gears will work as described if disposed with respect to one another at a variety of angles including a 90° angle or acute angles.

One of the significant advantages of this drive system is the elimination of excessive friction associated with more complex drives. Also, if dirt or other foreign objects should accumulate in the compartment or otherwise tend to interfere with the drive mechanism, this material will tend to fall through the gears rather than stall movement of the gears as with older drive systems. A foreign object would be more likely to stall rack and pinion or rack and worm gear drives. It will be appreciated that the improved trouble free operation of the drive system of the present invention is beneficial when it is considered that ventilation equipment is not always easily accessible for repair.

Because of the angular range through which the gear segments will cooperate, while allowing the damper shafts to be rotated through their operational range, the drive system herein disclosed represents an improved standardized damper drive system which may be used on a plurality of different models as well as custom installations.

The embodiments of the invention in which an exclusive property or privilege is claimed are defined as follows:

1. A ventilator system comprising:
   A. a ventilator compartment;
   B. first and second inlet ducts disposed adjacent one another and having outlets terminating in a common plane in said compartment;
   C. a damper assembly disposed in said compartment at the outlet of said first and second ducts and in the common outlet plane;
   D. said damper assembly having first and second sections associated with said first and second ducts, respectively, and said damper assembly having:
      1. a plurality of parallel damper shafts extending over the dimension of said first and
      2. a plurality of damper blades mounted on said shaft, the blades for said first section being mounted parallel with each other but in angular relation to the mutually parallel blades for said second section,
      3. a plurality of crank arms each mounted on one of said damper shafts,
      4. a damper connecting rod operatively interconnecting with each of said crank arms on said shafts for simultaneous synchronized damper modulating movement, and
      5. a first quadrant gear mounted on one of said damper shafts, said gear lying in a plane perpendicular to the axis of said damper shafts;
   E. a motor in said compartment fixedly mounted with respect to said damper assembly and having an output shaft; and
   F. a second quadrant gear mounted on said motor output shaft and operably engaged with said first quadrant gear, said first and second quadrant gears lying in planes at an angle with respect to each other.

2. The structure of claim 1 wherein said motor is fixedly mounted with respect to said damper assembly so as to be out of the path of air traveling through said compartment.

3. In a ventilating system for achieving and maintaining predetermined physical characteristics in the air at a location to be ventilated responsive to signals from said location, said system including a pair of adjacent inlet ducts each carrying ventilating air under a pressure differential to a common duct termination plane; an outlet compartment for receiving ventilating air from said ducts and delivering it to said location to be ventilated; said ducts carrying ventilating air having different physical characteristics which, when delivered into the outlet compartment in the proper proportions, will constitute ventilating air having physical characteristics such as to tend to achieve an optimum predetermined condition of air at the ventilation location; a damper assembly positioned across the plane of termination of said ducts in said compartment, said damper assembly having a first and second damper sections each associated with one of said inlet ducts; wherein the improvement comprises:

a plurality of mutually parallel damper shafts each extending across both of said ducts and each constituting part of each of said sections;
   a plurality of damper blades positioned on said damper shafts for regulating air flow from said ducts, a first parallel set of said blades being situated to control flow through said first damper section and a second parallel set of said blades being situated on said shafts in angular relation to said first set and in position to control flow through said second section;
   a damper drive linkage operatively connecting said shafts for rotative movement of said shafts and blades to regulate air flow in said ducts;
   a damper motor operably responsive to said signals, fixedly mounted with respect to said damper assembly and having an output shaft;
   a first quadrant gear mounted on said motor output shaft to lie in a plane at right angles thereto; and
   a second quadrant gear operably connected with said damper drive linkage and operably engaged with said first gear.

4. The structure of claim 3 wherein said quadrant gears are disposed in planes which lie at an angle with respect to each other.

5. The structure of claim 3 wherein said damper drive linkage includes a plurality of crank arms mounted on said damper shafts and a connecting rod pivotally interconnecting with said crank arms and wherein said second quadrant gear is mounted on a shaft having a crank arm pivotally interconnected with said connecting rod.

6. The structure of claim 5 wherein said second quadrant gear is mounted on one of said damper shafts.

7. The structure of claim 5 wherein blades for each of said damper sections are mounted on common damper shafts and lie in planes at an angle with respect to each other.

* * * * *